June 2, 1970 A. C. AVRIL 3,514,870
DRYING APPARATUS
Filed Oct. 9, 1968 9 Sheets-Sheet 1

INVENTOR.
Arthur C. Avril
BY Wood, Herron & Evans
ATTORNEYS

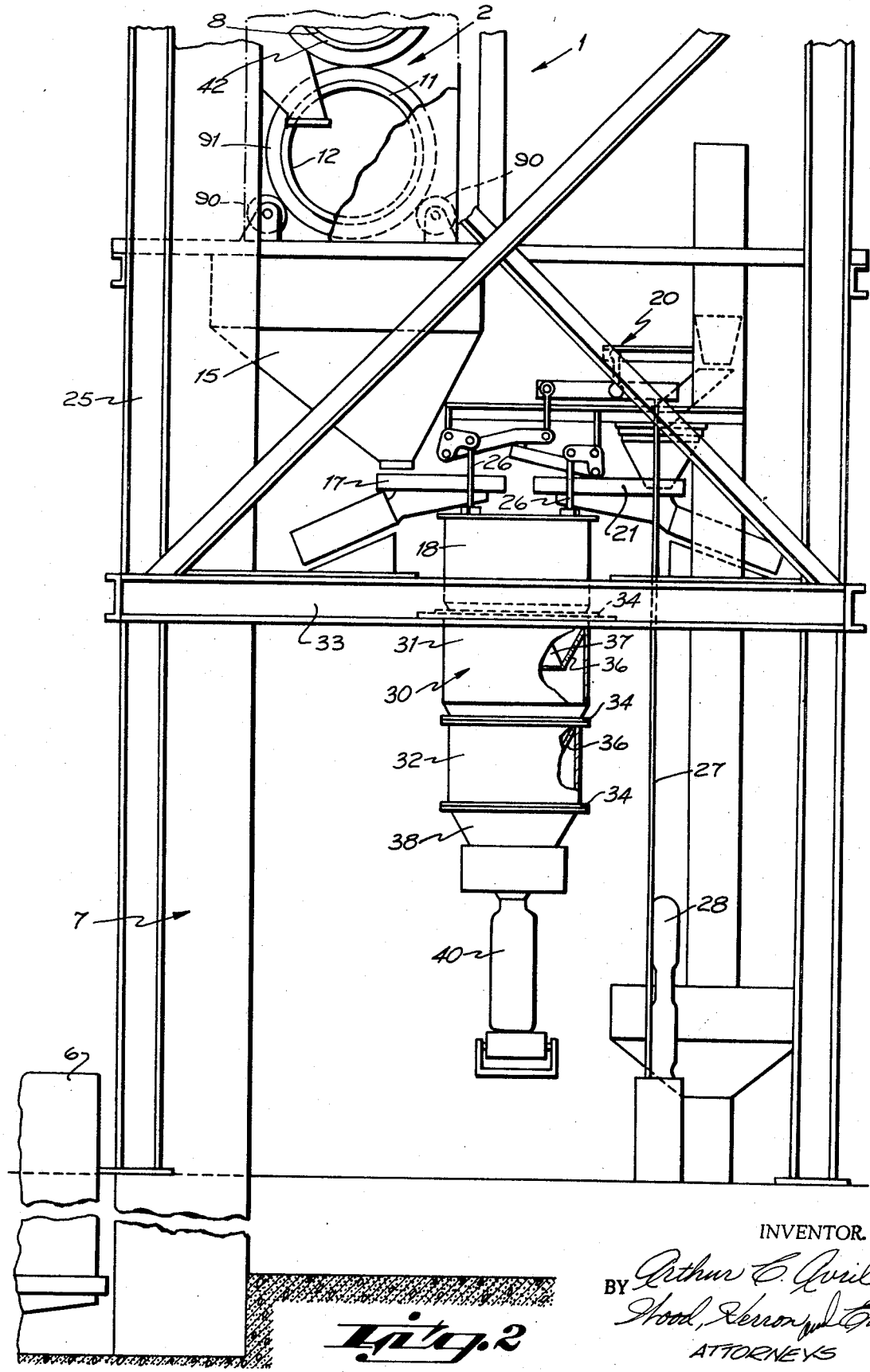

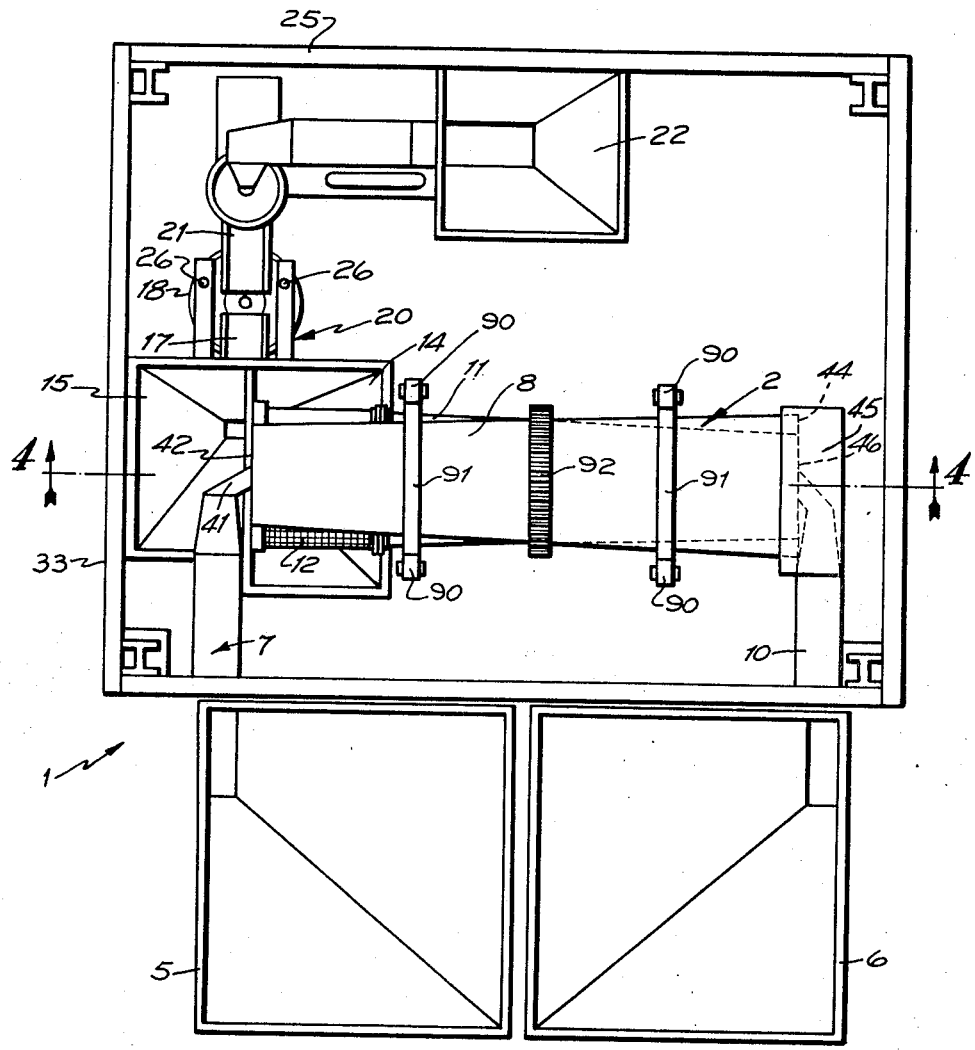

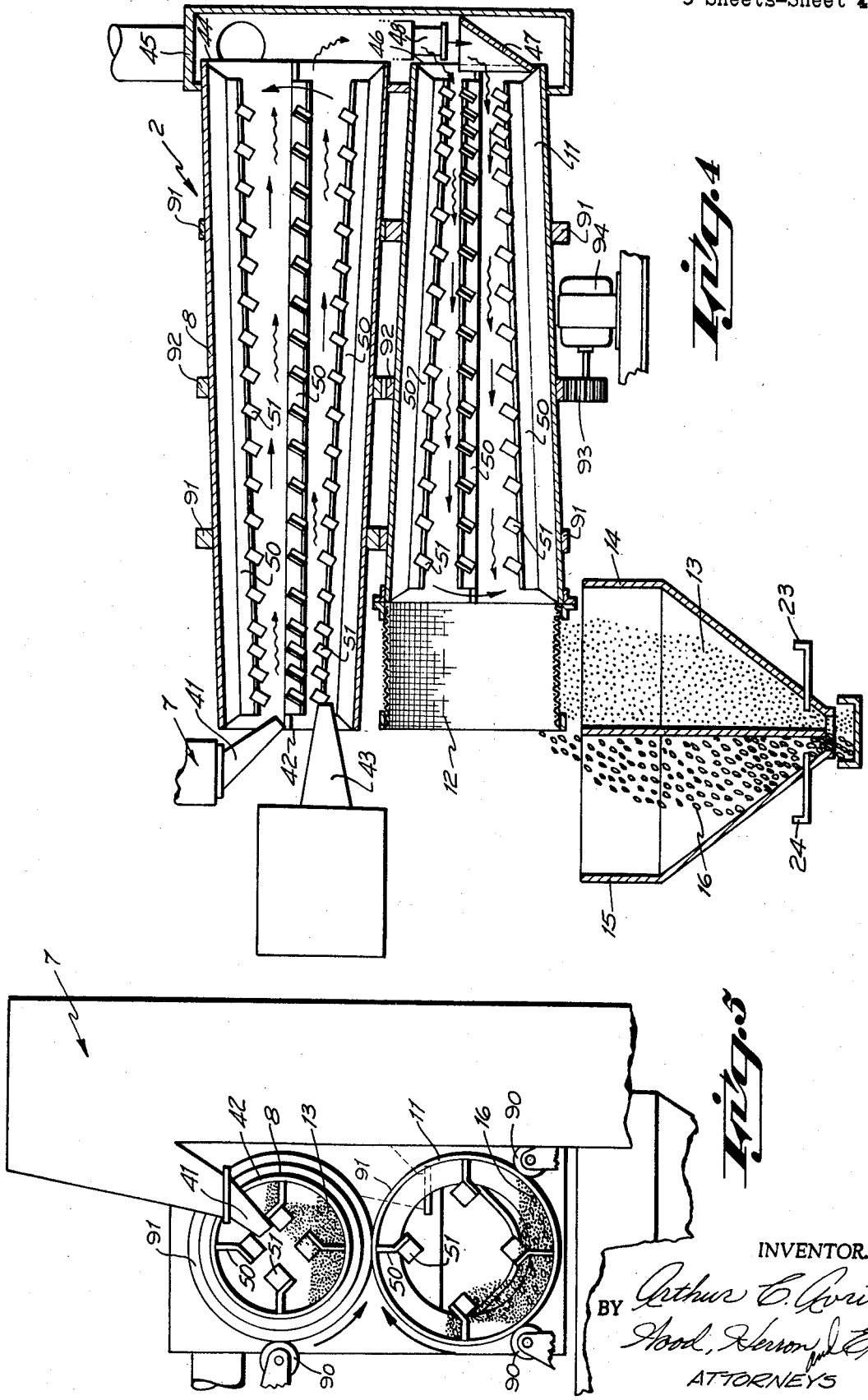

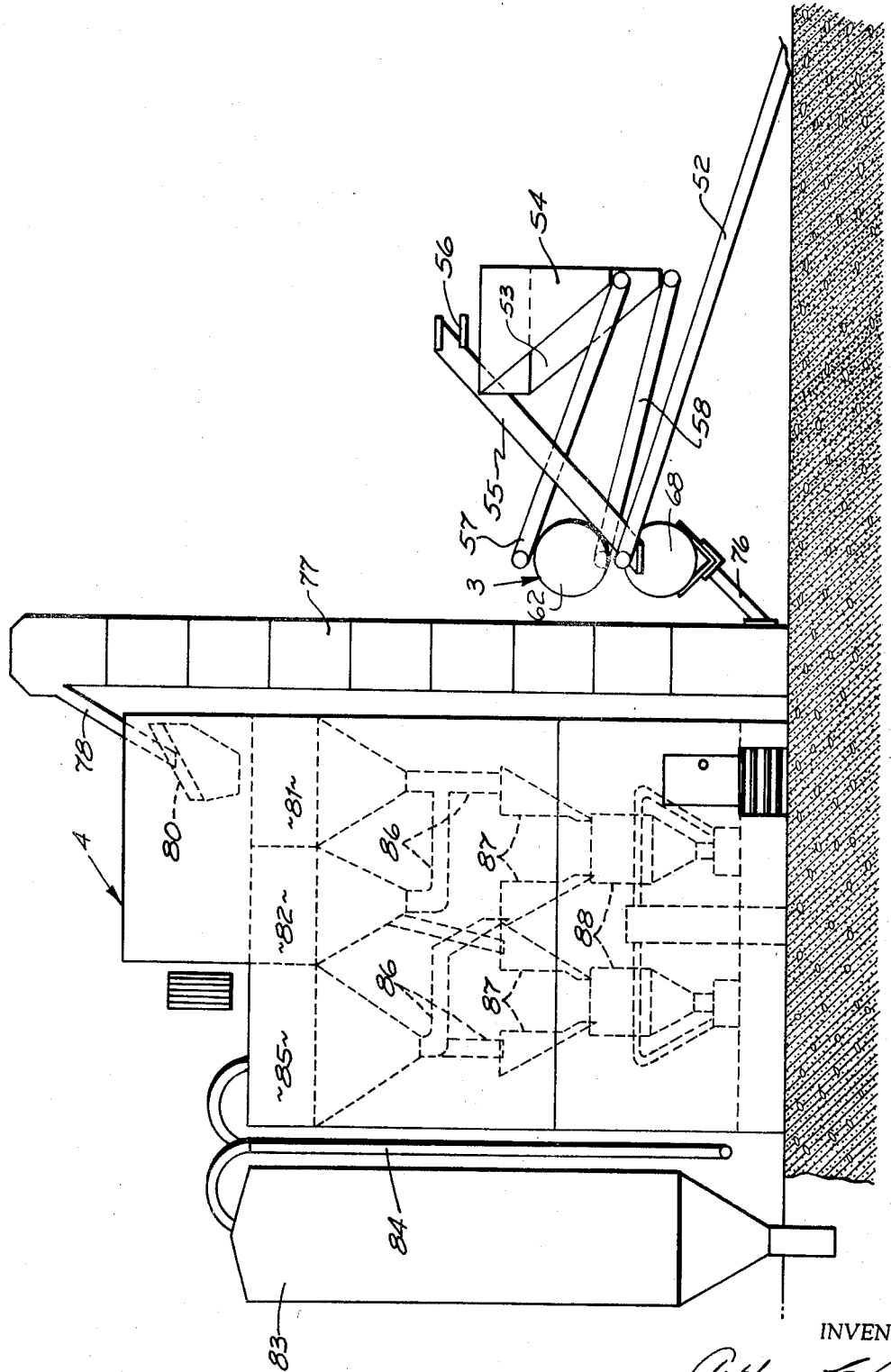

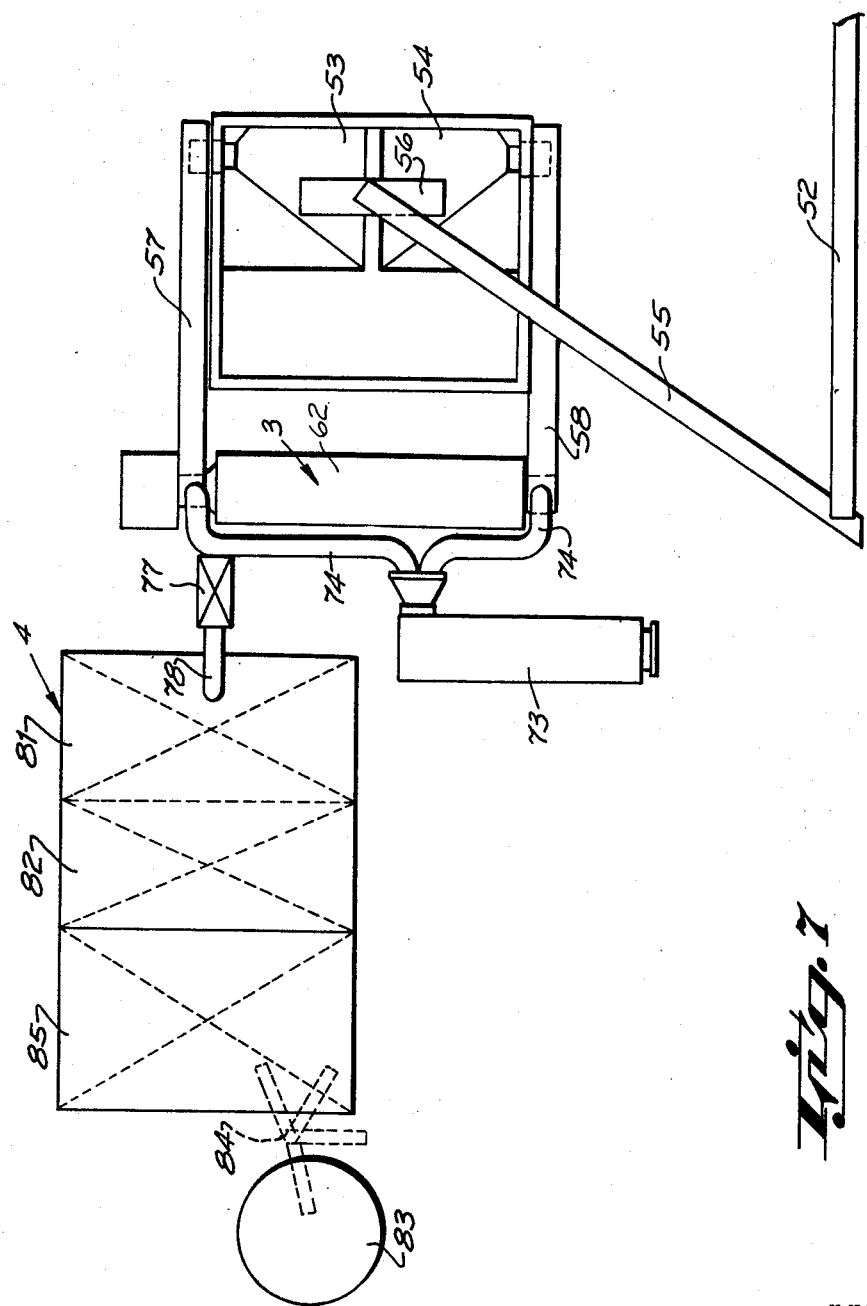

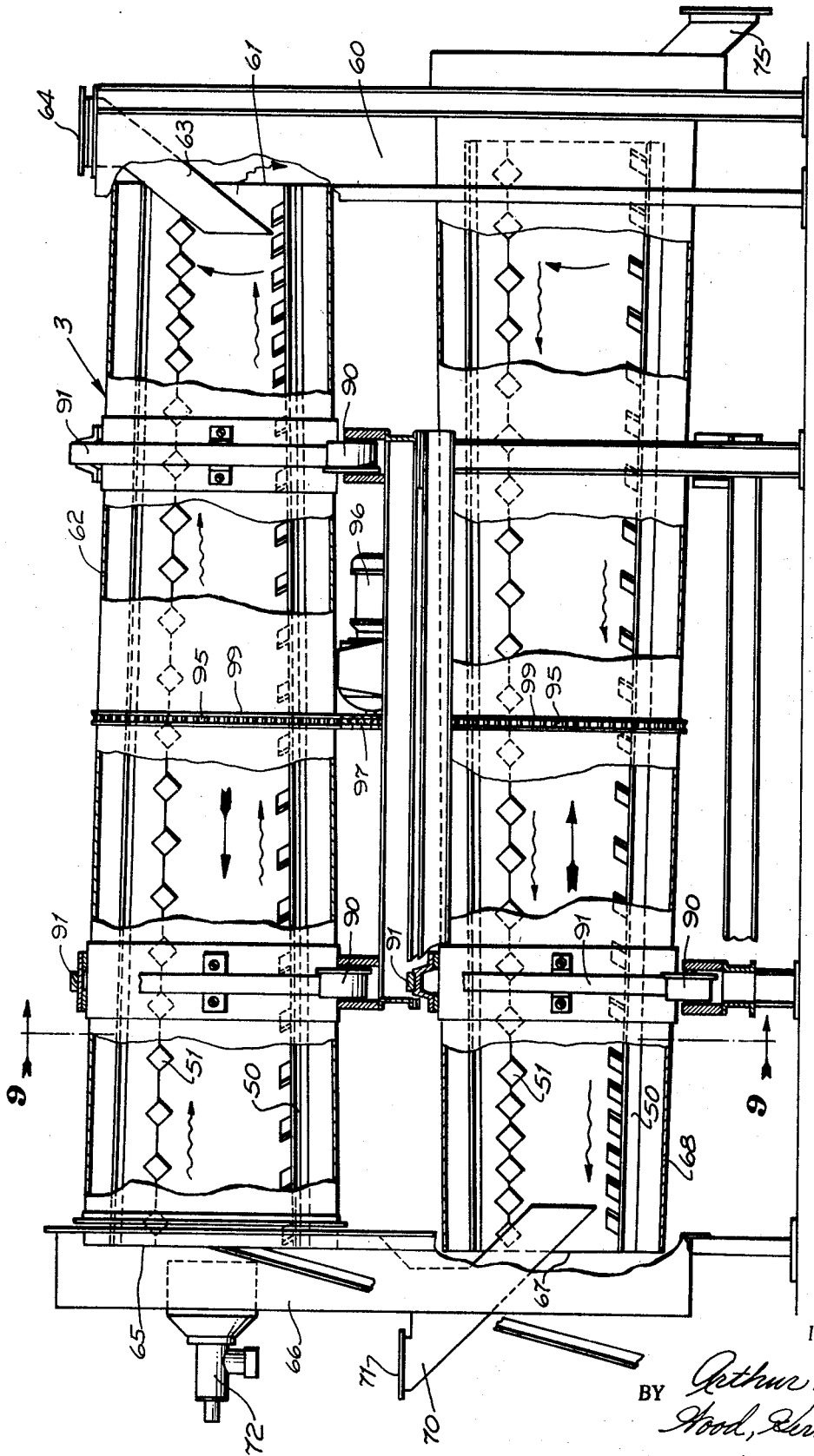

June 2, 1970      A. C. AVRIL      3,514,870
DRYING APPARATUS
Filed Oct. 9, 1968      9 Sheets-Sheet 8
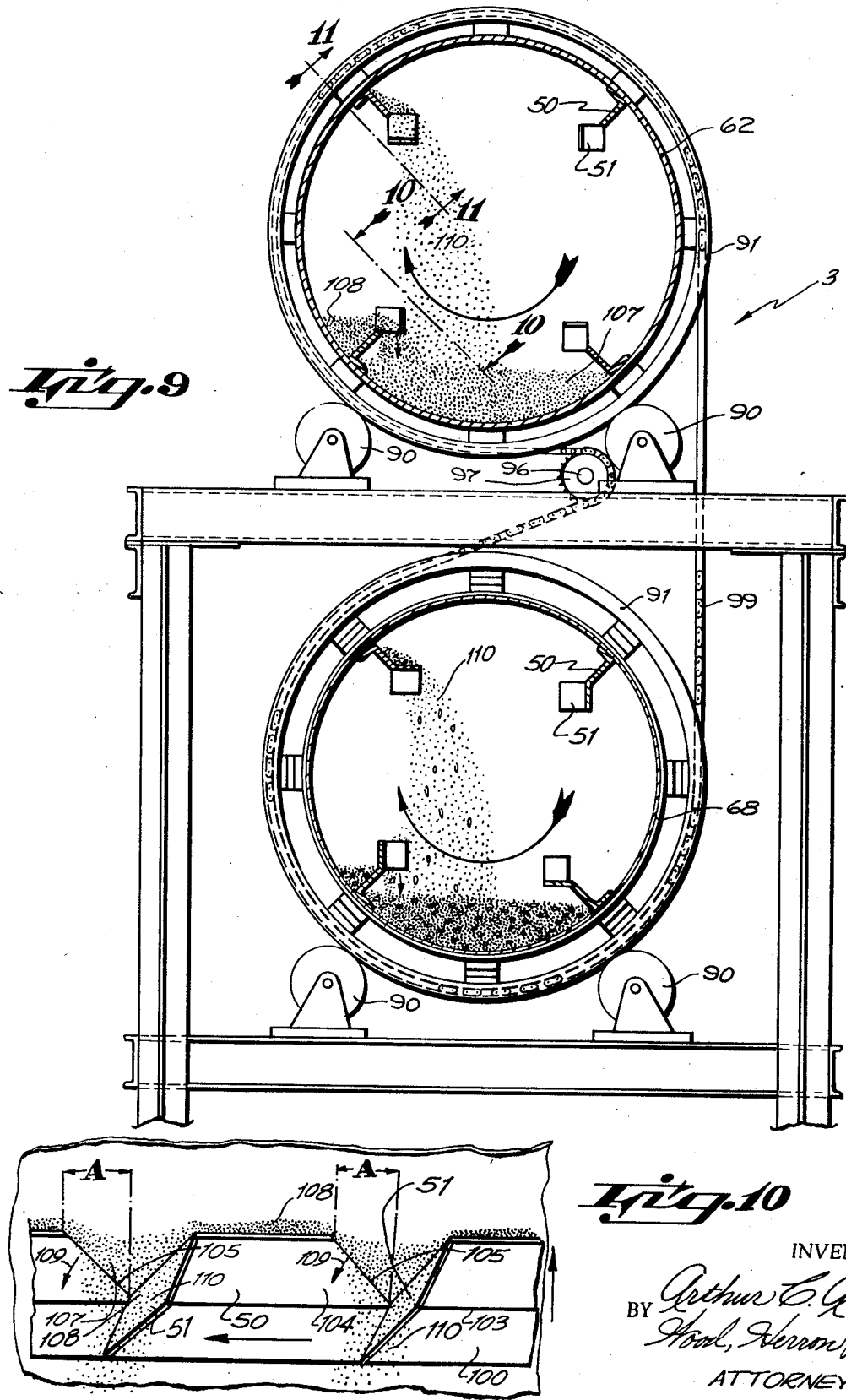

June 2, 1970 — A. C. AVRIL — 3,514,870
DRYING APPARATUS

Filed Oct. 9, 1968 — 9 Sheets-Sheet 9

INVENTOR.
BY Arthur C. Avril
Wood, Herron and Evans
ATTORNEYS

United States Patent Office 3,514,870
Patented June 2, 1970

3,514,870
DRYING APPARATUS
Arthur C. Avril, Cincinnati, Ohio, assignor to A & T Development Corporation, Cincinnati, Ohio, a corporation of Ohio
Filed Oct. 9, 1968, Ser. No. 766,243
Int. Cl. F26b 11/20
U.S. Cl. 34—108                            13 Claims

ABSTRACT OF THE DISCLOSURE

The disclosure relates to drying apparatus, for example, a heat exchange apparatus which is used in dehydrating sand and aggregates, such as raw, moist sand and gravel, involving the use of a pair of rotating drums, one constituting a sand heating drum and the second constituting a heat exchange drum, wherein the hot, dehydrated sand is commingled with the raw, moist gravel to drive off the moisture from the gravel by heat exchange, and, at the same time, to bring down the temperature of the mixture for immediate packaging.

Both drums are provided with lifting vanes which extend longitudinally and generally parallel with the axis of rotation of the drums. The vanes are provided with inclined impeller flights which slope with respect to the lifting vanes. The impeller flights produce a fanning or cascade action to disperse the material toward the center of the drums for faster drying and also, by virtue of the slope of the blades, to aid in advancing the material longitudinally through the drums, thus increasing the capacity of the apparatus.

BACKGROUND OF THE INVENTION

The dehydrating apparatus of the invention is intended particularly for use in conjunction with the dry concrete packaging plant disclosed in Pat. No. 2,904,942, which was issued to Arthur C. Avril on Sept. 22, 1959. The packaging plant disclosed in the patent involves the use of a dehydrating apparatus constituting rotating drums for drying the material by heat exchange and also to lower the temperature of the mixture sufficiently to permit immediate bagging after the material has been metered into the proper proportions and mixed with dry Portland cement. The drums disclosed in the prior patent are tapered longitudinally to provide a longitudinal gravity feed in response to drum rotation. The principles of the invention are also applied to the manufacture of other material involving the drying and mixing of the dried warm material with a pulverized product, such as lime in a mortar mix combined with sand.

The present apparatus is also intended for use in drying apparatus wherein a single rotating drum, equipped with the inclined impeller flights of the invention, performs the drying operation.

One of the primary objectives of the invention has been to improve the efficiency of a drying apparatus by providing lifting vanes which include impeller flights integral with the vanes for increasing the capacity of a given size rotatable drum.

According to this aspect of the invention, the impeller flights may be generally square in outline configuration, with one edge integral with the lifting vane, the vane having a cutout portion, such that the vane and impeller flight provide an inclined passageway. By virtue of the pitch or slope of the impeller vane, which may be disposed at an angle of substantially 45 degrees to the axis of drum rotation, the material is advanced as it flows over the lip portion of a given lifting vane in response to rotation of the drum. Impeller flights of other configurations are also adapted to the principles of the invention.

A further objective has been to improve the drying capacity of a drum having a given diameter and length.

For this purpose, the impeller flights and the companion openings of the vanes are spaced apart from one another longitudinally along the lifting vanes so as to create a fanning action as the vanes of the rotating drum pick up the material from the mass flowing by gravity along the bottom portion of the rotating drum. By fanning or breaking up the material into individual flow streams, there is provided a greater dispersion of the material toward the center of the drum for contact with the heat blast stream to further increase the drying efficiency of the drum of a given capacity.

Another objective has been to provide an arrangement whereby the dehydrating drums of an existing plant may be converted in a simple efficient manner to use agitator vanes having the improved impeller flights.

For conversion, the lifting vanes with the impeller flights are constructed as integral units, each vane having a flange or mounting foot including spaced openings to receive the shank portion of a bolt which secures the vane to the drum. Accordingly, the agitator vanes of an existing drum may be removed and replaced with the improved vanes of the invention without shutting down the plant for a prolonged period. The use of bolts also permits the expansion and contraction of the drums due to heating and cooling without the problem of warpage of the parts.

The various features and advantages of the invention will be more clearly apparent to those skilled in the art from the following detailed description and with reference to the drawings.

In the drawings:

FIG. 2 is a fragmentary, enlarged end elevation of the apparatus taken from FIG. 1.

FIG. 3 is a top plan view of the drying apparatus shown in FIG. 1.

FIG. 4 is a sectional view taken along line 4—4 of FIG. 3, illustrating the drying drums, including the impeller flights of the present invention.

FIG. 5 is an end view of the drying drums, projected from FIG. 4.

FIG. 6 is a diagrammatic side elevation of a packaging plant of modified construction utilizing the improved drying apparatus of this invention.

FIG. 7 is a diagrammatic top plan view of the packaging plant shown in FIG. 6.

FIG. 8 is a fragmentary side elevation of the drying drums utilized in the packaging plant of FIGS. 6 and 7, further illustrating the use of the impeller flights of this invention.

FIG. 9 is an enlarged end view of the drying drums as projected along line 9—9 of FIG. 8.

FIG. 10 is a diagrammatic view taken along line 10—10 of FIG. 9, showing the action of the impeller flights.

Packaging plants generally

Figure 1:
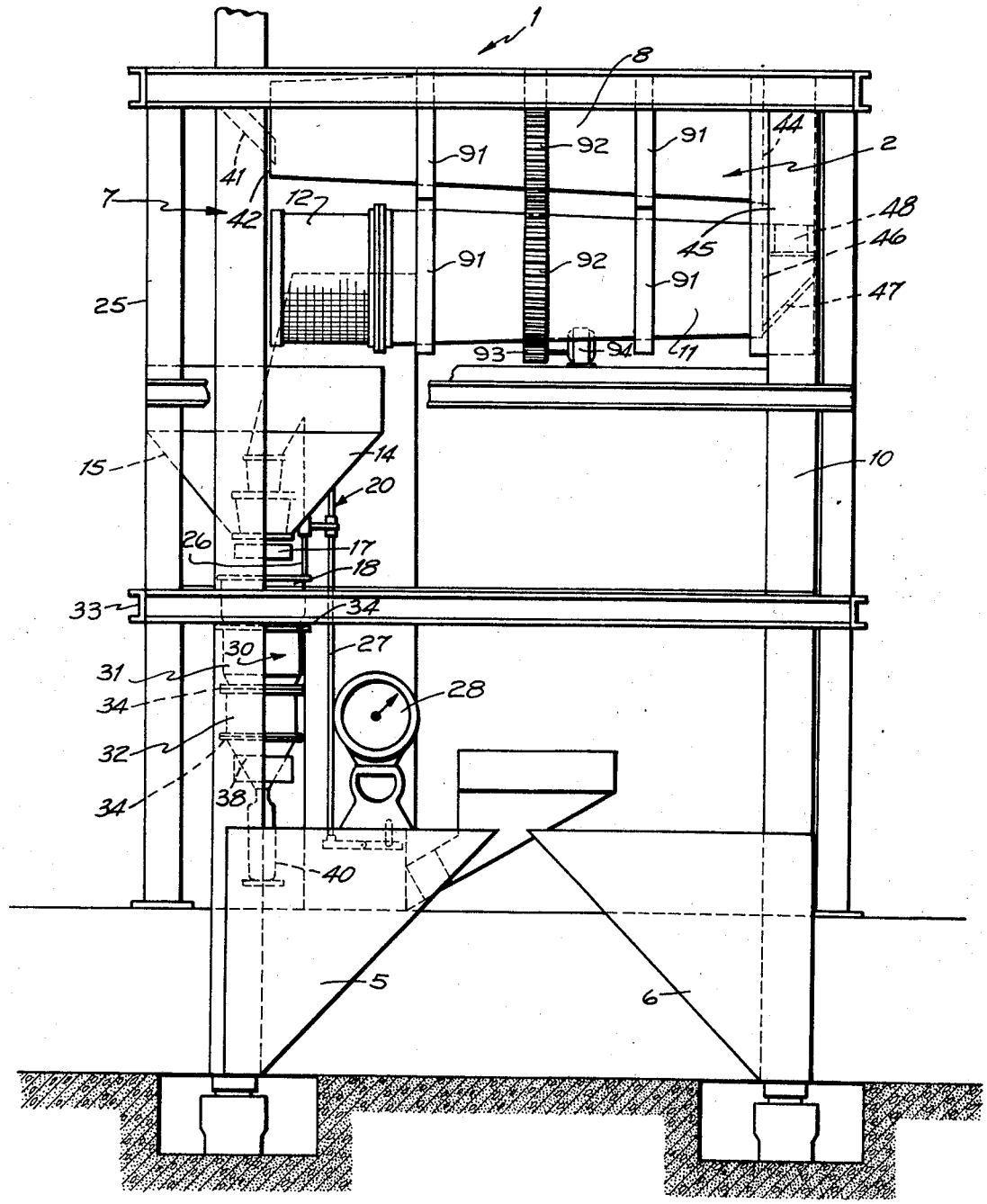
FIG. 1 is a side elevation of a packaging plant in which the drying apparatus includes lifting vanes provided with the impeller flights or blades of the present invention.
Figure 12:
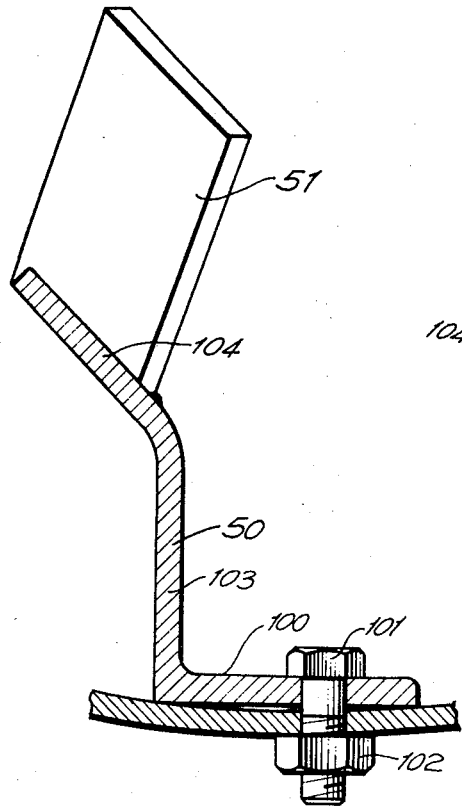
FIG. 12 is an enlarged sectional view taken along line 12—12 of FIG. 11, further illustrating the vane and impeller flights.

The packaging plant, indicated generally at 1 in FIGS. 1, 2 and 3, is similar to the plant disclosed in Pat.

2,904,942, issued to Arthur C. Avril on Sept. 22, 1959. The improved heat exchange apparatus of the present invention follows the principles of the apparatus illustrated in the prior patent but includes the improved impeller flights or blades of this invention, as described in detail later.

As noted above, the apparatus may be used in drying and packaging materials other than those disclosed, and the invention may be utilized in single drum dryers for other purposes.

The dehydrating apparatus shown generally at 2 in FIGS. 1–3 involves the continuous dehydration of sand and gravel or aggregates by heat exchange, coordinated with continuous packaging of the dehydrated materials after having been weighed and mixed with dry Portland cement to provide the finished product. Immediately after weighing and mixing, and while still warm, the batches of material are discharged into paper bags of moisture resistant material.

The improved heat exchange apparatus, disclosed generally at 2 in FIGS. 1—3, is intended primarily for converting existing plants, manufactured under the prior Pat. 2,904,942, to be converted to include the improved heat exchange dehydration apparatus, either by altering the heat exchange drums at the plant or by installing new heat exchange drums in which the agitator vanes are equipped with the impeller flights of the present invention.

The packaging plant disclosed in FIGS. 6 and 7, illustrates the use of the improved heat exchange apparatus, indicated generally at 3, in relation to the packaging plant, indicated generally at 4, which is of a slightly different design, as explained later.

It will be understood from the detailed disclosure which follows, that the improved heat exchange apparatus 2 of the existing plant 1 (FIGS. 1—3) and the heat exchange apparatus 3 of the modified plant 4 (FIGS. 6 and 7) are generally similar in construction, each utilizing the same principles of operation but differing in structural details to adapt the heat exchange apparatus to the particular plant of which it forms a part.

Existing packaging plant (in general)

Described briefly, the typical existing packaging plant 1, shown in FIGS. 1–3, for which the heat exchange apparatus 2 is intended, operates through successive weighing and mixing cycles, automatically metering the quantities of dry Portland cement, dehydrated sand and dehydrated gravel or other coarse aggregates. The plant creates a batch of dry concrete upon each cycle of operation, the cycles being under the control of an operator at the bagging station.

Generally speaking, after dehydration in the heat exchange apparatus 2, and during the cycle of operation, the separate metered ingredients (sand, gravel and Portland cement), are commingled and combined by agitation, then the mixed batch of ingredients is discharged into the bag. The bag, in the present example, is made from heavy paper or other fibrous material and is lined with a moisture-resistant material to prevent reabsorption of atmospheric moisture by the dry concrete mixture within it. After the batch of the dehydrated, warm, mixed concrete is discharged into the bag, the bag is closed and sealed at the operator's station, preferably by a stitching operation, and in its dehydrated condition it is ready for marketing or storage in a warehouse.

As a typical example of dry concrete, the dehydrate premixed batch may consist of 14 pounds of dry Portland cement, 30 pounds of sand, and 46 pounds of dehydrated gravel or an equivalent aggregate, the ingredients being discharged into a 90 pound bag at the end of each operating cycle, which, as noted above, is regulated by the operator who usually controls the operation of the stitching machine after the bag has been loaded.

According to the packaging plant shown in FIGS. 1–3, the raw, moist sand and raw, moist gravel may be transported directly from the source of supply in its naturally moist condition and delivered to the sand storage hopper 5 and to the gravel storage hopper 6. From the sand hopper 5 the sand is conveyed by an elevator, indicated generally at 7, and discharged from the elevator into the receiving end of the sand heating drum 8 (FIGS. 1, 3 and 4). In a similar manner, the gravel is conveyed from the gravel hopper 6 by way of the gravel elevator 10 to the receiving end of the heat exchange drum 11 of the heat exchange apparatus 2.

As explained later in detail, the raw, moist sand 13 passing through the sand heating drum 8 advances continuously from the sand elevator 7 into the receiving end of the rotating sand heating drum 8, and during passage therethrough, is agitated by internal vanes and is exposed to a blast flame, by means of which the raw, moist sand 13 is dehydrated to drive off surface moisture and absorbed internal moisture.

After this treatment, the hot, dehydrated sand 13 is fed from the discharge end of the sand heating drum 8 and fed into the receiving end of the heat exchange drum 11. A stream of raw, moist gravel 16 is fed into the receiving end of the heat exchange drum 11 along with the hot, dehydrated sand at a metered rate.

During passage of the hot sand through the heat exchange drum 11, the sand is again agitated by vanes within the rotating heat exchange drum, together with the raw, unheated, damp gravel 16. The vanes of the heat exchange drum 11 thus thoroughly commingle the sand and gravel particles, bringing the hot sand particles into contact with the irregular surfaces of the gravel particles (FIG. 5) to drive off, by heat exchange, the moisture from the gravel.

As the mixture of the sand 13 and the gravel 16 passes through the heat exchange drum 11, the mixture is exposed to an air blast stream so as to carry the water vapor off. After passage through the heat exchange drum 11, the mixture passes across a separator screen, preferably of the vibrating type. In some older plants, as disclosed in Pat. 2,904,942, a cylindrical separator screen 12 (FIGURE 4) forming a part of the heat exchange drum, is utilized. During passage across the rotating separator screen 12, the sand particles 13 pass through the screen and drop by gravity into a storage hopper 14 to receive the sand as it passes through the screen (FIG. 4).

A second storage hopper 15 is located immediately below the end of the screen 12 (or vibrating screen) to receive the gravel particles 16 which have been dehydrated by the hot sand 13 during passage through the heat exchange drum 11. The vibrating screen separator, noted above, performs the same function. From the hand hopper 14 and the gravel hopper 15, the two dehydrated materials are metered in the required proportions and fed through the packaging plant to be mixed with the dry Portland cement and then discharged into the bag.

Feeding and weighing apparatus (existing plant)

Described in greater detail, in the existing plant 1, which is converted for use with the improved heat exchange apparatus 2 (FIGS. 1–5), the dehydrated sand 13 and gravel 16, previously segregated during passage through the separator screen 12, are advanced in metered streams from the storage hoppers 14 and 15 by the vibrating feeder 17 to the scale hopper 18 of a weighing apparatus, indicated generally at 20 (FIG. 2). During the weighing cycle, a cement feeder 21 (or a feeder for other material), also of the vibrating type (FIG. 3), advances a metered flow stream of cement from the cement hopper 22 to the scale hopper 18 to be commingled with the dehydrated sand and gravel.

The scale hopper 18 is suspended from the beam system of the weighing apparatus 20, which in turn, is interconnected with an electrical circuit which controls the operation of the vibrating feeder 17 of the sand and gravel, and the vibrating feeder 21 for the Portland cement from the cement hopper 22.

Briefly, the control circuit decommissions the cement feeder 21 after a predetermined quantity of cement has been advanced from the cement hopper 22 to the scale hopper 18. When the cement feeder 21 is de-energized, the proper quantity of dry cement (or other pulverized material) will have been discharged into the scale hopper 18. Thereafter, the weighing apparatus 20 (which is interconnected with the control circuit) de-energizes the cement feeder and energizes the vibrating feeder 17 which advances the metered streams of dehydrated sand and dehydrated gravel from the surge hoppers 14 and 15 to the scale hopper 18.

In order to meter the quantities of sand and gravel issuing from the sand and gravel hoppers 14 and 15 to the vibrating feeder 17, the lower end portions of the surge hoppers 14 and 15, which communicate with the vibrating feeder 17 (FIG. 4), are provided with adjustable gates 23 and 24 (FIG. 4).

As best shown in FIG. 2, the heat exchange apparatus 2, the surge hoppers 14 and 15 and the vibrating feeders 17 and 21 (FIG. 3) for the sand, gravel and cement are all mounted upon a structural steel frame indicated generally at 25. The weighing apparatus, indicated generally at 20, is also suspended from the structural steel frame 25. Since this structure does not form a part of the present invention, the detailed structural elements have been omitted from this disclosure.

Generally speaking, the scale hopper 18 is suspended by a pair of links 26—26, having upper ends connected to the weighing apparatus 20 (FIG. 2). The scale beam system, which is balanced upon fulcrum points carried by the frame 25, includes a main link 27, the lower end of which is interconnected with a conventional weight scale 28 having a dial (FIGS. 1 and 2). The scale 28 includes suitable electrical switches (not shown) which are interconnected with the control system for regulating operation of the vibratory sand and gravel feeder 17 and the cement feeder 21. These switches de-energize the feeders 17 and 21 in response to the predetermined weight load of materials which are fed into the floating scale hopper 18. The hopper 18 forms a part of the blending apparatus, indicated generally at 30 (FIGS. 1 and 2).

After the vibratory feeders 17 and 21 have been decommissioned in response to the weight load of sand, gravel and cement, through operation of the weighing apparatus 20, a signal lamp indicates that the cycle is complete. At this point, the operator closes a discharge switch (not shown) which causes the ingredients to be discharged by gravity from the scale hopper 18 into the blending apparatus, which is indicated generally at 30.

Blending apparatus (existing packaging plant)

Generally speaking, the blending apparatus 30, in the form disclosed, comprises the three sections, including the scale hopper 18 and the lower blending sections 31 and 32. The blending sections 31 and 32 are supported by the cross beam structure 33 of frame 25. Thus, the blending sections 31 and 32 are fixed with respect to the floating scale hopper 18, which moves vertically in response to the weight load of the ingredients.

As disclosed in the United States Avril Pat. 3,369,798, issued on Feb. 20, 1968, the scale hopper 18 and the blending sections 31 and 32 each comprise an external cylindrical chamber (FIG. 2), the chamber of the upper section or scale hopper 18 being suspended from the weighing apparatus 20, as noted earlier. The cylindrical chambers of the blending sections 31 and 32 are supported by the beam structure 33 of the frame 25, each of the cylindrical chambers including flanges 34 which are bolted together and to the beam structure 33 to support the assembled blending apparatus 30.

In general, each blending unit, including the scale hopper 18, comprises a receiving cone 36 (FIG. 2) in the form of an inverted conical frustrum formed of sheet metal into which the ingredients are fed. A shiftable discharge cone 37, comprising an upright conical frustrum, has a lower edge or skirt portion seated against the discharge opening which forms the lower end of the inverted receiving cone. Each of the blending sections 18, 31 and 32 constitutes a self-contained unit, each being provided with an air cylinder or other power means (not shown) for elevating the discharge cones in sequence during the bagging operation. The sequential operation of the cones is regulated by an electrical control circuit including electrically operated valves which regulate the air flow to the actuating cylinders.

The lower end of the blending section 32 includes a collector chute 38 (FIG. 2) having a spout (not shown) at its lower end to receive the bag 40 into which the warm blended ingredients are discharged. As noted, the blending and discharge cycle is initiated manually by the operator at the completion of the feeding and weighing cycle.

Heat exchange apparatus (existing packaging plant)

As noted earlier, in the existing plant (FIG. 1–5), the raw sand and raw gravel are transported from the source of supply and are fed into the primary storage hoppers 5 and 6 by way of the elevators 7 and 10 (FIG. 1) for continuous dehydration and treatment. The sand elevator 7 includes a spout 41 (FIGS. 1 and 4) which projects downwardly from the sand elevator 7 into the charging end 42 of the sand heating drum 8. Also extending into the charging end of the rotating sand drum 8 is a heat blast nozzle 43 (FIG. 4) interconnected with a gas or oil burner (not shown) and arranged to project a blast flame longitudinally through the sand heating drum 8.

During advancement of the flow stream of raw sand 13 longitudinally through the sand heating drum 8, the sand is lifted by operation of a set of lifting vanes having impeller flights, according to this invention, for uniform exposure to the blast flame. Upon reaching the discharge end 44 (FIG. 4), the hot, dehydrated sand flows into a collector housing 45. The collector housing 45 encloses the right-hand end portion of the sand heating drum 8 and the heat exchange drum 11 and feeds the hot sand 13 to the charging end 46 of the heat exchange drum 11 in company with a flow stream of the raw, moist gravel issuing from the gravel elevator 10. For this purpose, the collector housing 45 includes a downwardly inclined deflector chute 47 (FIG. 4) which intercepts the flow stream of hot, dehydrated sand and directs it into the charging end 46 of the heat exchange drum 11.

In carrying out the heat exchange operation, the continuous stream of raw gravel 16, which is carried upwardly by the gravel elevator 10, issues from the elevator discharge spout 48, located within the collector housing 45 immediately above the collector chute 38. The raw gravel particles 16 are thus commingled with the hot, dry sand particles 13 as the two streams of material are deflected into the charging end 46 of the heat exchange drum 11.

During passage through the heat exchange drum 11, the hot sand is brought into intimate contact with the gravel particles by operation of the lifting vanes 50 coacting with the impeller flights 51 (FIGS. 4 and 8) which form a part of the agitator vanes both in the sand heating drum 8 and in the heat exchange drum 11.

As the stream of sand advances through the rotating sand heating drum (which is tapered longitudinally to provide a gravity flow from the intake to the discharge end), the stream of sand is agitated by the lifting vanes 50 and associated impeller flights 51 within the sand heating drum to drive off the surface moisture from the sand particles and also most of the absorbed internal moisture.

In the present improvement, the impeller flights 51 bring about a marked improvement in efficiency by creating a fanning or cascade action for dispersion toward the center of the drum, with the material advancing by reason of the pitch of the flights 51, thus increasing the capacity of the apparatus. This action is disclosed later in greater detail with reference to FIGS. 8–13.

During the sand heating operation (sand heating drum 8), the raw, damp sand is heated by the blast flame (nozzle 43) to a temperature in the neighborhood of 175° to 375° F., (depending upon the type of sand and its moisture content) as the stream of sand advances continuously through the sand drum 8 toward the collector housing 45. As indicated by the arrows, the sand 13 is then deflected from the collector housing 45 (deflector chute 47) into the charging end 46 of the heat exchange drum 11.

As the commingled streams of hot, dehydrated sand 13 and raw, moist gravel 16 flow through the heat exchange drum 11, as indicated by the arrows, the gravel particles are commingled with the sand particles, causing the gravel to be dehydrated by heat transfer from the hot sand. The combined streams of sand and gravel flowing through the heat exchange drum 11 are lifted by the vanes 50 and their associated impeller flights 51 which are located within the heat exchange drum the construction being similar to that described above with reference to the sand heating drum 11.

The efficiency of the heat exchange drum 11 is increased in the same manner, as noted above with reference to the sand, that is, the vanes 50 cause lifting of the mixture of sand and gravel particles while the associated impeller flights 51 create a cascade or fanning action so as to break the mixture into individual flow streams and to cause dispersion toward the center of the drum for more complete exposure to the air stream which flows through the heat exchange drum, as indicated by the arrows. The lead of the impeller flights 51, as noted with respect to the sand heating drum 8, causes the mixture of sand and gravel to advance longitudinally through the heat exchange drum 11 at an increased rate, further improving the operating efficiency.

Upon discharge from the heat exchange drum 11 (separator screen 12—FIG. 4), the mixture will have been reduced to a temperature substantially in the range of 130° to 170° F., at which temperature it is fed through the blending apparatus 30 and discharged into the bag 40.

In converting an existing plant to the improved heat exchange apparatus, the existing vanes 50 may be removed from the sand heating drum 8 and the heat exchange drum 11 and replaced with new vanes 50 which are equipped with the impeller flights 51 of this invention. The interchange can be carried out quickly and rather inexpensively, since the vanes 50 of the existing drums are bolted in place within the drums, as explained in detail later. The new vanes 50, with the impeller flights 51 welded in place, are drilled to match the holes of the existing drums and are bolted in place in the position previously occupied by the former vanes.

In the event that the sand and heat exchange drums show signs of excessive wear because of prolonged service, then in making the conversion, new drums, with the improved vanes and impeller flights, may be installed.

It will be noted that the arrangement of the agitator vanes 50 and the impeller flights 51, described above with reference to the sand heating drum 8 and heat exchange drum 11 (FIG. 4) are similar. In other words, the pitch of the flights 51 in the example of the invention of FIGURES 4 and 5 is in the same direction because of the reverse rotation of the two drums 8 and 11. On the other hand, in the embodiment illustrated in FIGS. 8–10, both drums rotate in the same direction; hence, the pitch of the impeller flights 51 is in the opposite direction, that is, the flights are pitched in the left and right directions.

Modified packaging plant (in general)

The plant, previously indicated at 4 in FIGS. 6 and 7, utilizes the same principle of operation as described above although the several components of the plant are arranged differently. It will be understood at this point that the sand and aggregates are transported in raw, moist condition and dehydrated by the modified heat exchange apparatus, indicated generally at 3. The modified heat exchange apparatus 3 is provided with agitator vanes 50 including impeller flights 51, similar to those described earlier, the principle of operation being identical in both forms of the invention.

The modified packaging plant (FIGS. 6 and 7), in general, comprises a bin (not shown) to which is transported the raw gravel and sand, the two materials being loaded alternately. A conveyor 52 advances the material from the storage bin alternately to the sand and gravel hoppers 53 and 54 by way of a branch conveyor 55, arranged to deliver the material to a reversible conveyor 56. The reversible conveyor 56 spans both the sand and gravel hoppers so as to load the hoppers alternately, depending upon the direction of operation.

From the sand and gravel hoppers 53 and 54, the material is discharged by gravity to a pair of belt conveyors 57 and 58. The conveyor 57 transports the raw sand 13 from the base of the sand hopper 53 to the end cover 60 (FIGURE 8) of the heat exchanger 3 for delivery to the charging end 61 of the sand heating drum 62. For this purpose, the upper end of cover 60 includes a chute 63 which deflects the sand from the conveyor 57 into the charging end 61, the upper end of cover 60 having an intake opening 64 into which the conveyor 57 discharges the sand. The sand flows through the sand heating drum 62 in the direction indicated by the arrow in FIG. 8, as described earlier.

The discharge end 65 (FIG. 8) communicates with a transfer housing indicated at 66 into which the heated sand is discharged for delivery to the charging end 67 of the heat exchange drum 68. The discharge end of the sand heating drum 62 and the charging end 67 of the heat exchange drum 68 both communicate with the transfer housing 66, such that the hot, dehydrated sand is deflected by way of the inclined chute 70 into the charging end 67. At the same time the raw, moist gravel is also discharged from conveyor 58 to the receiving end 71 of the chute 70. The hot sand is thus commingled with the raw gravel in advancing through the chute 70 to the charging end 67 of the heat exchange drum 68.

As described earlier with reference to FIG. 4, the sand advancing through the rotating sand heating drum 62 is heated by a blast flame nozzle 72 (FIG. 8) which passes through transfer housing 66, so as to direct the blast flame into the discharge end 65 of the sand heating drum. The heat blast stream thus is projected longitudinally through the sand heater in a direction opposite to the flow of sand, as indicated by the arrows.

The heated air stream generated by the heat blast nozzle 72 passes from the charging end of the sand heating drum 67 downwardly through the end cover 60 and into the discharge end 65 of the heat exchange drum 68, the heat flow stream being counter to the flow of material through the heat exchange drum, as indicated by the arrows. As shown in FIGURE 7, the heat exchange apparatus preferably includes a dust collector 73 of commercial design which is connected by way of ducts 74—74 to the end cover or housing 60 and to the transfer housing 66.

As the dehydrated sand and gravel flow from the discharge end of heat exchange drum 68, the mixture discharges by way of a spout 75 (FIG. 8) through an inclined duct 76 (FIG. 6) to an elevator 77. At the top of the elevator 77, the material discharges by way of chute 78 to a vibrating screen, indicated at 80, mounted above a sand hopper 81 (FIGS. 6 and 7). The vibrating screen 80 separates the sand 13 from the gravel 16 and discharges the sand by gravity into the sand hopper 81. The gravel flowing across the inclined vibrating screen 80 discharges into the gravel hopper 82. The sand and gravel hoppers 81 and 82 may be subdivided and the vibrating screen 80 may be arranged to separate the coarse and fine particles for discharge into the segregated compartments to be recombined later in the required proportions.

The dry Portland cement is charged into a cement bin 83 (FIGS. 6 and 7) by way of elevator 84, as indicated by the arrow. From the bin, the cement is charged into a cement hopper 85 by way of the feeder 86, as indicated by the arrow.

The sand, gravel and cement from the hoppers 81, 82 and 85 flow from the base of the hoppers in metered quantities by way of the feeders indicated diagrammatically at 86 (FIG. 6) to respective scale hoppers, indicated generally at 87—87. The scale hoppers interconnected with the gravity-responsive scale apparatus, described earlier, by means of which the several feeders 86 are decommissioned automatically in response to the weight load of material charged into the hoppers 87. At the end of the weighing cycle, the contents of the scale hoppers 87 are discharged into the blenders 88—88, also described earlier and from the base of the blenders into the bags (not shown).

As noted earlier, the heat exchange apparatus 2 (FIGS. 1–5) and the heat exchange apparatus 3 of the modified packaging plant (FIGS. 6–9) both operate upon the same principle, the drums in both units having longitudinal agitator vanes 50 which are equipped with the impeller flights 51 of the invention. As explained earlier, the heat exchange drum 11 of the converted plant is equipped with the cylindrical screen 12 for separating the sand and gravel as it issues from the discharge end of the heat exchange drum 11 (FIG. 4).

In the modified packaging plant (FIGS. 6–9) the heat exchange apparatus, previously indicated at 3, is not equipped with a cylindrical separator screen; instead, the commingled, dehydrated sand and gravel mixture is separated by the vibratory screen 80 after it passes through the heat exchange apparatus.

Generally speaking, the heat exchange apparatus 2 (FIGS. 1–5) is supported upon the frame 25 of plant 1 by means of rollers 90 tracking against the trunnion bands 91 mounted upon the drums 8 and 11. The lower drum 11 is cradled between the pairs of rollers 90 while the upper drum 8 is stabilized laterally by the sets of rollers 90 with its bands 91 in tracking engagement with the bands of a lower drum 11. The drums 8 and 11 each include a ring gear 92, the gears being in mesh with one another and driven by pinion 93 of motor 94.

The upper and lower drums 62 and 68 of the heat exchange apparatus 3 of plant 4 (FIGS. 8 and 9) are similarly supported by sets of rollers 90 tracking upon trunnion bands 91. In this case, both the upper and lower drums are cradled between the sets of rollers 90. The drums are rotated by a sprocket chain 99 meshing with sprocket rings 95 mounted on the drums. The chain is driven by a motor 96 which includes the sprocket 97 meshing with chain 99.

Lifting vanes

Described in detail (FIGS. 10–13), the vanes are of generally Z-shaped configuration and comprise in part longitudinal agitator vane 50 and a foot portion 100, which is secured to the sand heating drum or the heat exchange drum, as the case may be, by means of bolts 101 projecting through the foot portion and wall of the drum and including nuts 102 threaded upon the bolts on the exterior of the drum. Rising at right angles from the foot 100 and generally radial to the axis of rotation of the drum, is a flange 103, the projecting outer end portion of flange 103 being bent angularly as at 104. The angular portion 104 of the vane forms a lip which slightly slants in a leading direction with respect to the direction of rotation of the drum. During drum rotation, the material is scooped up and the material flows in response to the rotary motion of the drum, as explained later.

Figure 11:
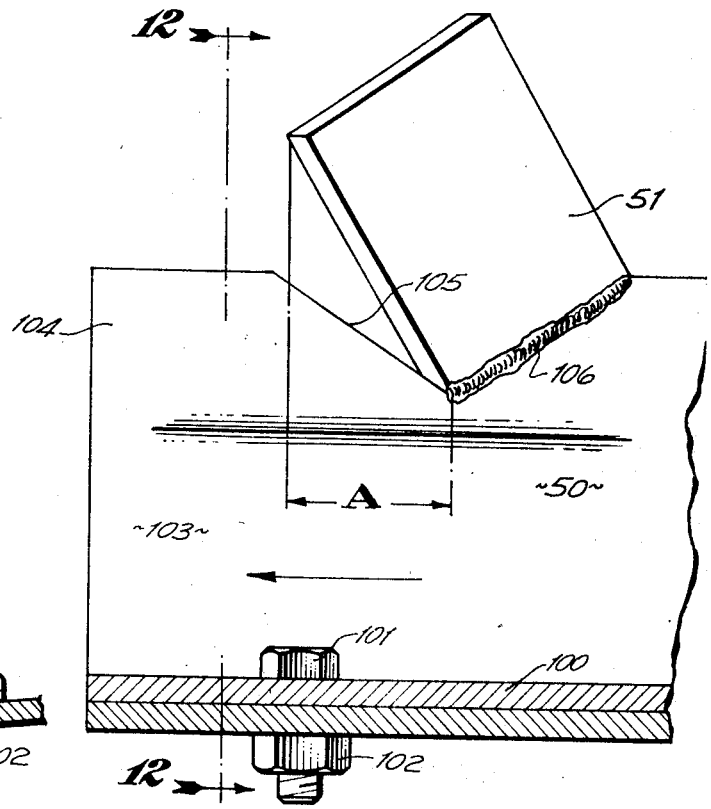
FIG. 11 is an enlarged fragmentary sectional view taken along line 11—11 of FIG. 9, showing a portion of one of the lifting vanes and the impeller flights of this invention.
Figure 13:
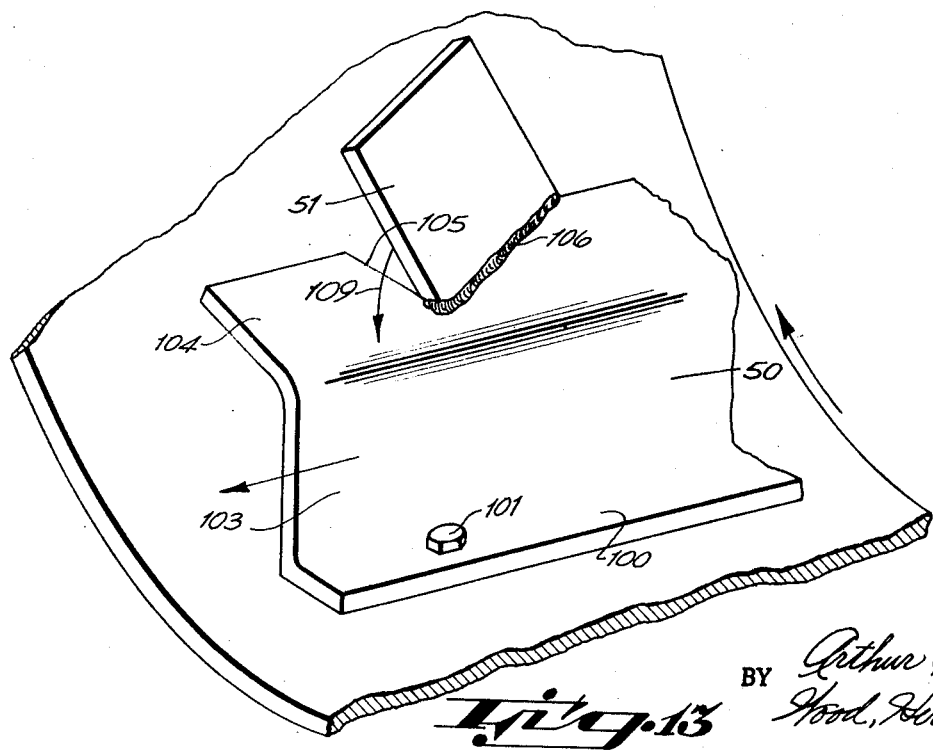
FIG. 13 is a fragmentary perspective view showing a portion of one of the vanes and the associated impeller flight.

According to the present improvement, the outer portion of the angular lip 104 includes cutout sections 105 (FIGS. 11 and 13) extending downwardly from the outer edge of the angular lip 104 approximately to the base of lip 104, that is, the lip portion joining the right angular flange 103 of the agitator vane. Each impeller flight 51, which is generally square, has one edge welded as at 106 to the edge of the cutout portion 105, as indicated in FIGS. 11 and 13. It will be noted in FIGS. 10 and 12 that the slope of the generally rectangular inclined impeller flights 51 is in a direction downwardly from the lip 104 toward the discharge end of the drum, so as to impel the material in that direction.

OPERATION

The following description is made particularly with reference to FIGS. 8–13, since these views show, on a larger scale, the arrangement of the agitator vanes 50 and impeller flights 51. As best shown in FIG. 9, the major portion of the raw, moist sand, indicated at 107, is accumulated in the bottom portion of the sand heating drum 62 and is advanced in the direction indicated in FIG. 8 in part due to the taper of the sand heating drum 62 and in part by reason of the pitch of the impeller flights 51. By reason of the rotation of the drum, the rotating agitator vanes 50 scoop up and elevate a portion of the sand mass 107 as indicated at 108. (FIG. 9).

As the vane rotates upwardly beyond the approximate ten o'clock position, the sand 108 begins to spill by gravity over the lip portion 104 of the agitator vane 50 and across the downwardly inclined impeller flight 51, as indicated by the arrow 109 in FIG. 10. By reason of the lead of the impeller flight the quantity of sand 108, which previously was scooped from the main mass 107 is advanced or inched forward in the direction indicated by the arrow in FIG. 8. The degree of advancement is equal approximately to the width A of the impeller flight 51 (FIGS. 10 and 11). The advancement thus brought about by the flights is added to the natural advancement of the mass of sand 107 in the lower portion of the drum by reason of the longitudinal taper of the drum.

The action of the impeller flights thus accelerates the flow of material and by so doing increases the capacity of a given size drum. In addition to the accelerated flow advancement of the material, the impeller flights 51 have the advantage of breaking the material into individual cascading flow streams 110 (FIG. 10) thus exposing the sand particles more directly to the blast stream flowing through the drum.

It will be apparent that the same action takes place in the heat exchange drum 68, in which case the mixture of sand, gravel and Portland cement is advanced and agitated. It will be noted (FIG. 8) that the pitch angle of the impeller flights of the heat exchange drum 68 is reversed with respect to the flights of sand heating drum 62. This relationship is required because both drums rotate in the same direction while it is necessary to feed the materials in opposite directions.

The heat exchange apparatus 2 shown in FIG. 4 carries out the same action with respect to the agitation and advancement of the materials. In this case, the impeller flights are pitched in the same direction because the two drums are rotated in opposite directions, as indicated by the arrows in FIG. 5, causing the materials to flow in opposite directions.

Having described my invention I claim:

1. In a drying apparatus for dehydrating materials comprising:

a rotatable heating drum tapered longitudinally from the charging end to the discharge end;

means for feeding the material into the charging end of the rotatable heating drum for passage through the heating drum at a predetermined rate to the discharge end of the heating drum;

means for supplying heat to the heating drum for heating and dehydrating the material;

a plurality of generally Z-shaped lifting vanes mounted within the heating drum, said lifting vanes being spaced apart radially about the internal periphery of the drum and extending longitudinally thereof;

and a plurality of generally rectangular inclined impeller flights connected to and extending substantially normal to each of said lifting vanes and spaced equidistantly and longitudinally apart from one another along the lifting vane;

said inclined impeller flights sloping from said lifting vanes in a trailing direction with respect to the direction of drum rotation and toward the discharge end of the drum;

each of said vanes having passage means formed between the respective inclined impeller flights and said vanes;

the direction of slope of the inclined impeller flights being related to the direction of rotation of the drum so that said passage means defines inclined passageways delineated by the impeller flights and related vanes;

said lifting vanes acting to scoop a portion of the material which is advancing through the lower portion of the rotating drum and, during rotation of the drum, to elevate the said portion of material;

said inclined passageways which are delineated by the impeller flights and related vanes, discharging the material which is scooped up by the lifting vanes and advancing the material longitudinally through the drum toward the discharge end thereof as a consequence of the direction of slope of the inclined impeller flights.

2. A drying apparatus as set forth in claim 1 in which the heating drum is tapered longitudinally from the charging end to the discharge end, whereby the material flows longitudinally through the heating drum toward the discharge end in part by gravity and in part by operation of the inclined passageways of the lifting vanes which are delineated by the slope of the inclined impeller flights and the related vanes thereof.

3. A drying apparatus as set forth in claim 1 in which the lifting vanes each comprise a flange portion extending in a generally radial direction toward the axis of rotation of the heating drum, each of said vanes having a lip portion extending at an angle to said flange portion in a leading direction with respect to the direction of rotation of the heating drum, the impeller flights having an edge joined to said lip portion, the related impeller flights being attached to said lip portion adjacent an edge thereof to form the inclined passageway.

4. A drying apparatus as set forth in claim 1 in which the lifting vanes each comprise a flange portion extending in a generally radial direction toward the axis of rotation of the heating drum, each of said vanes having a lip portion extending at an angle to said flange portion in a leading direction with respect to the direction of rotation of the heating drum, the impeller flights having an edge joined to said lip portion, the related impeller flights being attached to said lip portion adjacent an edge thereof, said inclined impeller flights each sloping in a trailing direction with respect to the direction of drum rotation and toward the discharge end of the drum.

5. A drying apparatus as set forth in claim 1 in which the lifting vanes each comprise a flange projecting generally toward the axis of rotation of the drum, said impeller flights having one edge secured to said agitator vane, the slope of the inclined impeller flight being in a trailing direction with respect to the direction of rotation of the drum and toward the discharge end of the drum.

6. A drying apparatus as set forth in claim 1 in which the lifting vanes each comprise a flange projecting generally toward the axis of rotation of the drum, said impeller flights having one edge secured to said lifting vane, said vane passage being located in a diagonal position relative to the edge portion of the lifting vane, the slope of the inclined impeller flight being in a trailing direction with respect to the direction of rotation of the drum and toward the discharge end of the drum.

7. A heat exchange apparatus for dehydrating sand and aggregates, said heat exchange apparatus comprising:

a rotatable sand heating drum having a charging end and a discharge end;

means for feeding raw, moist sand into the charging end of the rotatable sand heating drum for passage through the drum to the discharge end thereof;

means for supplying heat to the sand heating drum for heating and dehydrating the sand;

a rotatable heat exchange drum having a charging end and a discharge end;

means for feeding aggregates into the charging end of the heat exchange drum;

means for feeding the heated sand from the discharge end of the sand heating drum to the heat exchange drum, thereby to mix the hot sand and aggregates to dehydrate the aggregates by heat exchange between the sand and aggregates;

a plurality of lifting vanes mounted within the rotatable sand heating drum and rotatable heat exchange drum for scooping material from the bottom portions of the rotating drums;

said lifting vanes being spaced apart radially about the internal periphery of the drums and extending longitudinally thereof;

and a plurality of inclined impeller flights connected to and extending substantially normal to each of said lifting vanes and spaced longitudinally apart from one another along the lifting vanes;

the inclined impeller flights sloping in the trailing direction in relation to the direction of drum rotation and in a direction toward the discharge ends of said drums;

the slope of said inclined impeller flights discharging the material which is scooped up by the lifting vanes and advancing the material longitudinally through the drums toward the discharge end thereof during rotation of the drums.

8. A heat exchange apparatus as set forth in claim 7 in which the sand heating drum and heat exchange drum rotate in opposite directions and in which the lifting vanes of the sand heating drum and the heat exchange drum have lip portions which are angulated in a leading direction with respect to the opposite directions of rotation of the drums, the impeller flights sloping from said lips in a trailing direction with respect to the opposite directions of drum rotation and toward the discharge end of the sand heating drum and heat exchange drum, the slope of the inclined impeller flights acting to advance the material longitudinally through the drums toward the discharge ends of the drums.

9. A heat exchange apparatus as set forth in claim 7 in which both the sand heating drum and heat exchange drum rotate in the same direction and in which the lifting vanes of the sand heating drum and the heat exchange drum have lip portions which are angulated in a leading direction with respect to the direction of rotation of the drums, the impeller flights sloping from said lips in right and left hand directions and in a trailing direction with respect to the direction of rotation of the drums and toward the discharge end of the sand heating drum and heat exchange drum, the slope of the inclined impeller flights acting to advance the material longitudinally through the drums in right and left hand directions and toward the discharge ends of the drums.

10. A heat exchange apparatus as set forth in claim 7 in which the sand heating drum and heat exchange drum rotate in opposite directions and in which the lifting vanes of the sand heating drum and the heat exchange drum have lip portions which are angulated in a leading direction with respect to the opposed direction of rotation of the drums, the impeller flights sloping from said lips in the same directions in both of said drums and in a trailing direction with respect to the direction of rotation of the drums and toward the discharge end of the sand heating drum and heat exchange drum, the slope of the inclined impeller flights acting to advance the material longitudinally through the drums in right and left hand directions as a consequence of the opposed direction of rotation of the drums and toward the discharge ends of the drums.

11. A heat exchange apparatus as set forth in claim 7 in which the sand heating drum and the heat exchange drum are both tapered longitudinally from the charging end to the discharge end, whereby the sand flows longitudinally through the sand heating drum and heat exchange drum toward the discharge ends thereof in part by gravity and in part by operation of the inclined impeller flights.

12. A heat exchange apparatus as set forth in claim 7 in which the lifting vanes each comprise a flange portion extending in a generally radial direction toward the axis of rotation of the sand heating drum and heat exchange drum, each of said vanes having a lip portion extending at an angle to said right angular portion in a leading direction with respect to the direction of rotation of the sand heating drum, and heat exchange drum the impeller flights having an edge joined to said lip portion, the related openings of the impeller flights being formed in said lip portion adjacent the edge of the inclined impeller flight which is joined to the lip portion, said inclined impeller flights each sloping in a trailing direction with respect to the direction of drum rotation and toward the discharge end of the drum.

13. A heat exchange apparatus as set forth in claim 7 in which the lifting vanes of the sand heating drum and heat exchange drum each have passage means therebetween formed by the edge portion thereof adjacent the impeller flights, said impeller flights having inclined passageways arranged to discharge the material which is scooped up by the lifting vanes and to advance the material in right and left hand directions toward the discharge ends of the said drums.

References Cited

UNITED STATES PATENTS

| | | | |
|---|---|---|---|
| 1,774,649 | 9/1930 | Hepburn et al. | 259—148 |
| 2,309,810 | 2/1943 | West | 263—32 X |
| 3,245,154 | 4/1966 | Bojner et al. | 34—109 X |

ROBERT A. O'LEARY, Primary Examiner

T. W. STREULE, Assistant Examiner

U.S. Cl. X.R.

259—3